Aug. 19, 1924.
L. PETERSEN
1,505,420
MACHINE FOR REMOVING BURS FROM GEARS
Filed Feb. 19 1923   3 Sheets-Sheet 3
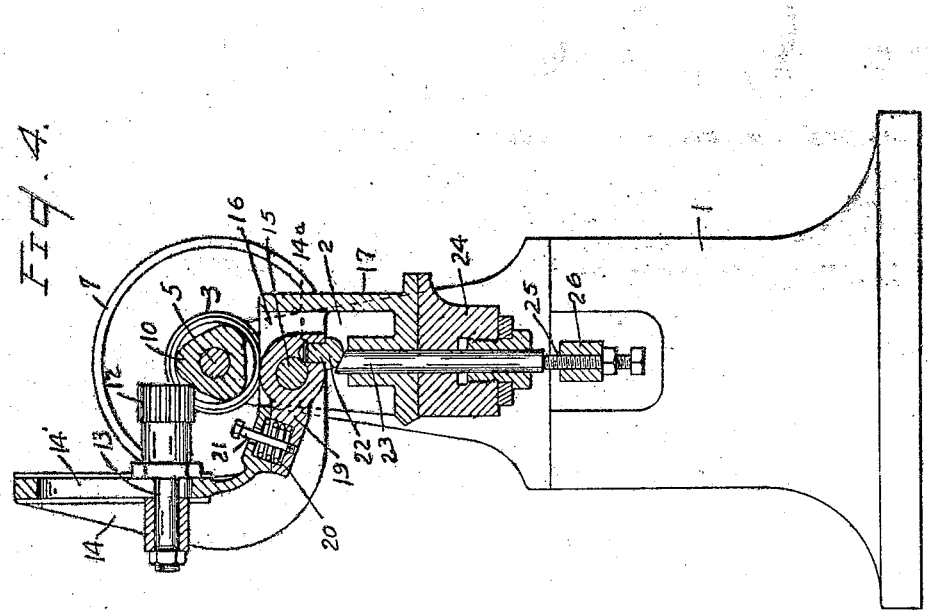
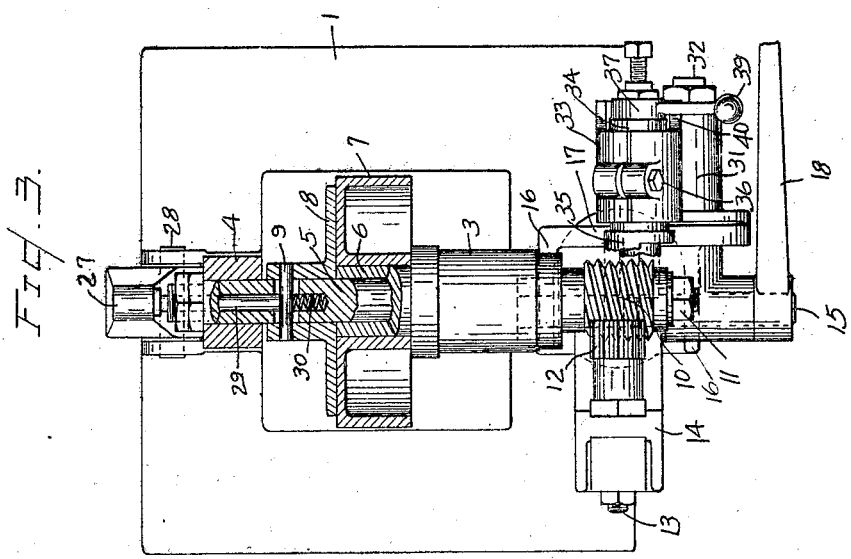
Inventor
Louis Petersen
By B. F. Wheeler
Attorney Patented Aug. 19, 1924.

1,505,420

UNITED STATES PATENT OFFICE.

LOUIS PETERSEN, OF DETROIT, MICHIGAN, ASSIGNOR TO JOSEPH P. LANNEN, OF DETROIT, MICHIGAN.

MACHINE FOR REMOVING BURS FROM GEARS.

Application filed February 19, 1923. Serial No. 619,912.

*To all whom it may concern:*

Be it known that I, LOUIS PETERSEN, a citizen of Denmark, residing at Detroit, in the county of Wayne and State of Michigan, have invented a new and useful Machine for Removing Burs from Gears, of which the following is a specification.

This invention relates to machines for removing burs from cut gears.

When gear teeth are formed by a milling cutter or the like the edges of the teeth at one end thereof are burred. This is due to the fact that the metal close adjacent said edges has no backing to oppose a shearing resistance to the cutter as the latter closely approaches said edges, so that the metal is deflected endwise of the gear. Removal of the burs thus formed by hand, as in the present practice, is a laborious and time consuming operation.

It is a primary object of the present invention to provide a mechanically driven tool which will cleanly remove the burs from a cut gear and will accomplish this result much more rapidly than is permitted by manual methods heretofore in general use.

The invention consists furthermore in various adjustments adapting the machine to operate on gears of various sizes.

A feature of the construction is an automatic provision for compelling the operator to establish the work holder of the machine in a position to engage the work with the driven tool before a drive connection may be established to said tool.

In attaining these objects, the invention contemplates engaging a spirally ribbed roll or worm with the burred end of a gear rotatively carried by a suitable holder, driving said worm while pressed firmly against the burred edge, thereby bending the bur back from the edge of the tooth, the gear being rotated by said worm to carry the gear teeth into successive engagement with said worm, and engaging a scraper with the burred end faces of the teeth under the aforesaid rotation of the gear to shear off the burs.

A preferred embodiment of the invention is hereinafter described and illustrated in the accompanying drawings, wherein, Fig. 1 is a view of the bur removing machine in side elevation.

Fig. 3 is a plan view partly in section upon line 3—3 of Fig. 1.

Fig. 4 is a vertical sectional view taken upon line 4—4 of Fig. 1.

Figure 1:
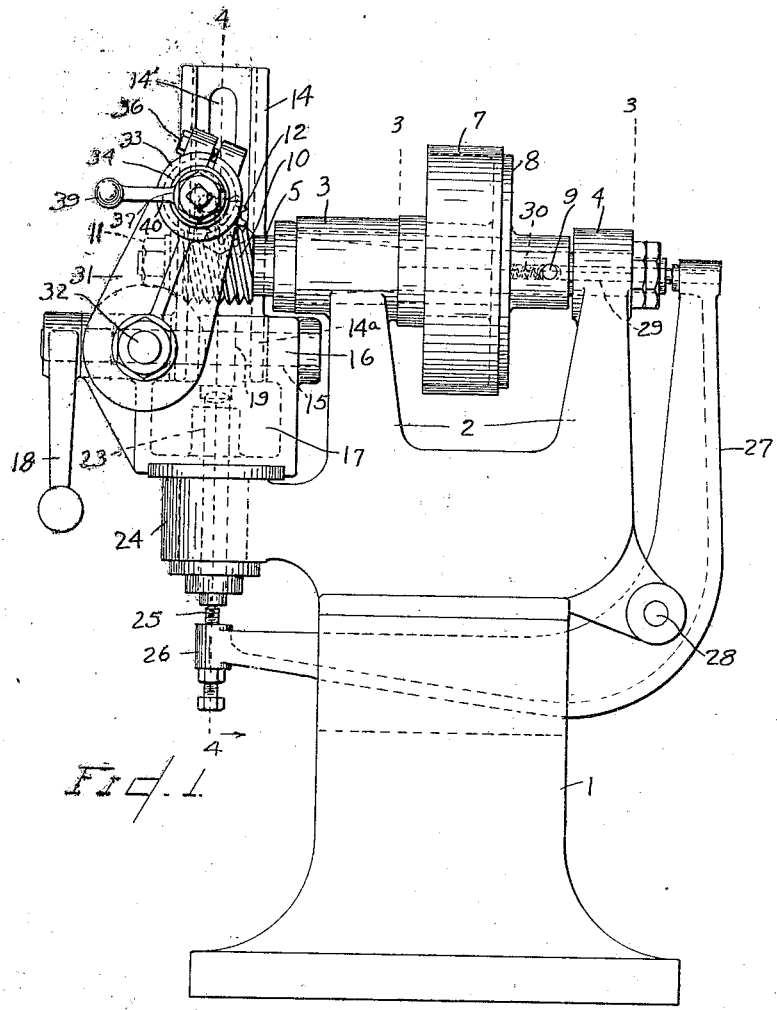
Figure 2:
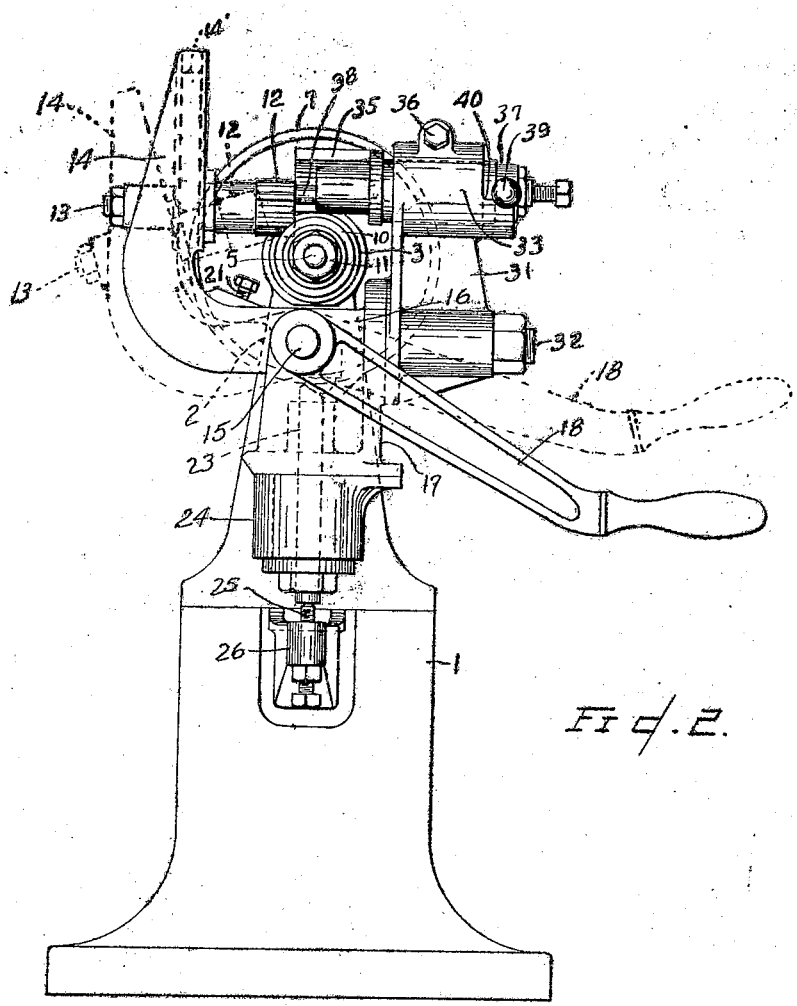
Fig. 2 is an end view of the same.

In these views the reference character 1 designates a standard having a pair of spaced upstanding arms 2 integrally surmounted by bearings 3 and 4 in which a shaft 5 is journaled. A sleeve 6 rigidly projecting from the bearing 3 and surrounding the shaft 5 mounts a loose pulley 7 between said bearings, to which pulley power may be applied through a belt, not shown. A side face of said pulley is adapted to be engaged by a friction clutch disk 8 pinned to the shaft 5, as indicated at 9, to establish a drive to said shaft. An end portion of said shaft projecting beyond the bearing 3 provides a mounting for a worm or spirally ribbed roll 10, which is clamped fast thereupon by a nut 11. The drawings, and more particularly Fig. 4, show the worm 10 to be triple-toothed but the number of teeth or threads upon the worm is not of importance. 12 designates a pinion up which the worm 10 is operating, the teeth of the latter meshing with the burred ends of the teeth of the former. It has not been attempted to show the burs, these being too small to appear in the views employed, and being well known to those familiar with the art. Said pinion 12 is carried by a work holder comprising a spindle 13 rotatively mounting the pinion, and an arm 14 having an upright upper portion carrying said spindle and a horizontal lower portion terminally pivoted upon a rock-shaft 15. A longitudinal slot 14' in the upright portion of said arm receives the spindle 13, adapting the same to be clamped to the arm at various heights so that gears of various diameters, when mounted upon said spindle, may properly engage the worm 10. Said rock-shaft is journaled in a spaced pair of bearings 16 formed upon a support 17 of the standard 1, which support is rigid but not integral with said standard. A lever 18 mounted fast upon an end of said rock-shaft is adapted to swing the arm 14 to move the work, as represented by the pinion 12, into and out of engagement with the worm 10. The invention provides a lost-motion actuating connection between the shaft 15 and arm 14 in order to permit a final movement of the lever 18 after the travel of the arm 14 to work engaging position has been completed, said final movement being employed to establish the clutch drive to the shaft 5. Hence the pivotal end of the arm 14 is forked to form bearings 14ª loosely engaging the shaft 5, and between said bearings there is mounted fast upon said shaft a short arm 19, the free end of which projects below the horizontal portion of the arm 14. (See Fig. 4.) Between said end and the overlying arm, there is compressed a coiled spring 20, urging the two arms divergently toward a limiting relative position established by a bolt 21 rigidly upstanding from the arm 19 and headed above the arm 14 to act as a stop. It is to be understood, therefore, that when the arm 14 is swung out of its working position, shown in the drawings, the arms 14 and 19 are slightly diverged, and that the contacting relation, shown in Fig. 4, is established only by a final movement of the lever 8, during which movement the arm 14 is stationary in working position. To utilize this final motion of the lever for establishing the clutch drive connection, there is mounted upon the pivotal end of the arm 19 a depending pin 22 having a rounded head for bearing eccentrically upon the inclined upper end of a plunger 23. Said plunger is vertically slidable through a supporting extension 24 on the standard 1, and below said extension bears through an adjusting screw 25 upon one arm 26 of a bell-crank lever 26—27 (see Fig. 1) said lever being pivoted at its angle to a bracket on said standard, as indicated at 28. The arm 27 of said bell-crank projects upwardly from said pivot and has its free end adapted to bear upon a push-rod 29, axially carried by the shaft 5 and having its other end abutting against the pin 9. Thus upon exertion of a down pressure upon the arm 26 of the bell-crank, the resultant swinging of the latter subjects the push rod 29 to pressure from the arm 27, which pressure acts through said rod upon the pin 9 to press the clutch member 8 into driven engagement with the pulley 7. Upon relief of pressure on the plunger 23 (by raising the lever 18) the clutch member 8 is thrown out of effective engagement with the pulley 7 by a spring 30, coiled axially within the shaft 5 and bearing upon the pin 9. During the initial upward actuation of the lever 18 which releases the drive connection, as just described, the arm 19 will swing away from the arm 14 but the latter will still be held in working position by the spring 20, and the work 12 will remain engaged with the worm 10 until the so called lost motion movement of said arms is checked by the stop 21 through further upward movement of said lever by which the arm 14 and work will be swung away from said worm.

Describing now a stop encountered by the work when the latter is engaged with the worm 10, to limit the pressure under which such engagement is maintained, a bracket 31 pivotally secured adjustably by a bolt 32 to the support 17 of the standard, projects upwardly and is terminally formed with a split bearing 33, in which is clamped a sleeve 34. From said sleeve a semi-cylindrical stop member 35 projects above the worm 10 and is terminally engageable by the work 12, limiting movement of said work toward said worm. The clamping bolt 36, connecting the split walls of the bearing 33, holds the sleeve 24 and stop 35 rigidly in their position of adjustment.

The operation upon the work is completed by scraping off the burs which have been bent back by the worm 10. Thus a rock-shaft 37 journaled in the sleeve 24 eccentrically carries projecting from its outer end a scraper pin 38, preferably of tool steel, which pin is adapted to abut against the end faces of the teeth of the gear 12, scraping the burs from said teeth as the gear is rotated through its engagement with the worm. A handle 39 upon the rear end of said shaft 37 is adapted to rock the shaft through a limited angle sufficient to adjust the scraper 38 into or out of engagement with the work. A shoulder 40 upon the bearing 33 forms a stop upon which the handle 39 bears when the scraper is in its operating position.

In the operation of the machine, the operator first slips a gear to be deburred upon the spindle 13, adjusting said spindle at an elevation to permit the end edges of the teeth to properly bear upon the worm 10. When a quantity of gears of the same size are being operated on, one adjustment of the spindle 13 will suffice for all. The lever 18 is then swung down, first effecting movement of the arm 14 to working position and establishing the gear 12 in engagement with the worm 10, and then shifting the clutch member 8 and establishng a drive to the worm. Engagement of the stop member 35 by said gear takes care of any excessive pressure that may be applied (through the lever 18) to the gear, and avoids any resulting mutilation of the gear by the worm. The worm teeth mesh with the burred ends of the teeth of the gear 12, bearing against the burred edges of the teeth with sufficient pressure to bend the burs back from said edges. The worm acts also to rotate the engaged gear so that the teeth of the gear are successively brought to bear upon the worm. When the rotation of the gear has advanced a tooth or teeth, which have been acted upon by the worm, to a point where the scraper 38 may engage the same, the operator rocks the handle 39 to the position shown in the drawings, in which position the end of the scraper bears against the end of the gear in the path of the teeth of the gear, and laterally engages and removes the burs therefrom as said gear rotates. The initial bending of the burs effected by the worm 10 destroys the flexibility of the burs so that they will readily shear off when engaged by the scraper. Without the preliminary bending, the burs would tend to simply flex between the gear teeth under pressure of the scraper.

If it were permitted to shift a gear into or out of engagement with the worm while the latter is being driven, the ends of the gear teeth would possibly be marred or mutilated. The invention eliminates this possibility by controlling the drive connection to the worm in common with the rocking movement of the work holder, so as to require engagement of the gear with the worm preliminary to establishment of the drive connection and breaking of said connection preliminary to disengaging the gear from the worm.

The described machine may be readily operated by an unskilled employe, and is adapted to accomplish its function rapidly and efficiently.

What I claim is:

1. In a machine of the character described, the combination with a gear holder, of means permitting rotation of the gear, of means engageable with the burred ends of the gear teeth for bending the burs back from the burred edges of the teeth, and a scraper adapted to bear against the burred ends of the teeth for severing the burs.

2. In a machine as set forth in claim 1, means for shifting the gear holder to engage the gear with or disengage it from said bur bending means.

3. A machine as set forth in claim 1, rotation of the gear being effected by its engagement with the bending means and the gear teeth being consecutively engaged with the scraper by such rotation.

4. A machine as set forth in claim 1, the bending means being a worm with its axis substantially transverse to that of the gear holder, and drive means for said worm, the gear being rotatively actuable by the worm to successively engage the gear teeth with said worm, and with said scraper.

5. In a machine as set forth in claim 1, drive mechanism for the bur bending means, a clutch connection between said drive mechanism and the bending means, and a common means for shifting the gear holder to engage the gear with and disengage it from the bending means and for controlling said clutch connection.

6. In a machine as set forth in claim 1, drive mechanism for the bur bending means, a clutch connection between said drive mechanism and the bending means, means having a lost motion connection with the gear holder for shifting the gear into and out of engagement with the bending means, and a mechanism employing the lost motion movement of the last named means for controlling said clutch connection.

7. A machine as set forth in claim 1, the gear holder being adjustable relative to the bending means to adapt gears of different sizes to be engaged with said means while carried by said holder.

8. In a machine of the character described, a gear holder, a worm mounted transversely to the axis of the gear holder to mesh with the burred ends of a gear on said holder for bending the burs, drive means for said worm, and means for relatively shifting the gear holder and worm to engage and disengage the gear and worm.

9. In a machine as set forth in claim 8, a stop limiting the pressure under which the gear and worm are engaged.

10. In a machine of the character described, a worm, a gear holder movable to and from the worm to engage or disengage the burred ends of the teeth of a gear on said holder with or from the worm, means for manually effecting said movement of the gear holder, and a stop engageable by a gear on said holder to limit the pressure under which the gear is engaged with the worm.

11. In a device of the character described, a worm, a gear holder movable to and from said worm to engage or disengage the burred ends of the teeth of a gear on said holder with or from said worm, and a scraper engageable by the burred ends of the gear teeth while said ends engage the worm, said stop being rotatable about an axis parallel to that of the gear holder in the position of use of the latter and being eccentric to said axis, and means for rocking the stop about said axis to vary its position of contact with the gear.

12. In a device of the character described, the combination with a bur bending tool, of a holder for a burred gear, drive mechanism for said bending tool, a clutch connection between said drive mechanism and tool, a rock arm carrying the gear holder for shifting the gear on the holder into and out of engagement with the bending tool, a rock shaft mounting said arm, means for manually rocking said shaft, a lost-motion drive connection from said shaft to said arm, a plunger operable by said shaft in taking up the lost motion of said drive connection, and a bell crank lever pivoted substantially at the juncture of its arms, one of said arms being engaged by said plunger and the other exercising control of said clutch connection.

13. In a machine of the character described, the combination with a gear holder permitting rotation of the gear, of means engageable with the burred ends of the gear teeth for forcing the burred edges of the teeth back from the end of the gear.

14. A machine as set forth in claim 13, rotation of the gear being effected by contact with the forcing means with which the gear teeth consecutively engage.

In testimony whereof I sign this specification.

LOUIS PETERSEN.